United States Patent [19]
Davies et al.

[11] 3,877,397
[45] Apr. 15, 1975

[54] INCINERATORS

[75] Inventors: Robert John Davies, Kent; Dennis George Blows, Essex, both of England

[73] Assignee: Foster Wheeler John Brown Boilers Limited, London, England

[22] Filed: Dec. 7, 1972

[21] Appl. No.: 313,057

[30] Foreign Application Priority Data
Dec. 10, 1971 United Kingdom............... 57590/71
Oct. 10, 1972 United Kingdom............... 46713/72

[52] U.S. Cl................................. 110/8 R; 34/57 A
[51] Int. Cl............................................... F23g 5/00
[58] Field of Search.................... 110/7 R, 8 R, 8 C; 34/57 R, 57 A

[56] References Cited
UNITED STATES PATENTS
| | | | |
|---|---|---|---|
| 3,397,657 | 8/1968 | Tada | 110/8 |
| 3,399,637 | 9/1968 | Hirchfield | 110/8 |
| 3,495,556 | 2/1970 | Steerer et al. | 110/8 |
| 3,577,938 | 5/1971 | Muirhead et al. | 110/8 |
| 3,589,313 | 6/1971 | Smith et al. | 110/8 |
| 3,598,374 | 8/1971 | Nauta | 34/57 |

*Primary Examiner*—Kenneth W. Sprague
*Attorney, Agent, or Firm*—Pollock, Philpitt & Vande Sande

[57] ABSTRACT

This invention relates to waste disposal incinerators which comprise a fluidisable bed of refractory particles and a waste inlet positioned so as to allow waste to be introduced into the bed when fluidised at a point within the fluidised region of the bed, fluidising gas and fuel being supplied when necessary to the bed. A chamber is provided in which hot refractory particles and any non combustibles are collected for cooling before removal from the incinerator and separation of non combustible from refractory particles which can be returned to the bed.

14 Claims, 6 Drawing Figures

INCINERATORS

BACKGROUND OF THE INVENTION

In the field of pollution control the disposal of many residues is most effectively carried out by means of incineration. In general these incinerators are provided with a suitable furance for the combustion of the residues, a means for the collection and disposal of the resultant ash, and in some instances an afterburner system to deodorise or fully combust the flue gases emitted from the furnace.

For the satisfactory combustion of sewage and other sludges with their high moisture content, usually of about 95%, and variable calorific value it is necessary to provide a furnace of sufficiently high thermal capacity to absorb these variations without the consequential disturbance to the quality of combustion. In particular it is essential to ensure that the exhaust gases are deodorised by exposure to temperature of the order of 800°C for a sufficient length of time and in many instances this is ensured by means of an afterburner or flue gas recirculation system. Similarly, for efficient disposal of the combustible material, an adequate residence time and degree of turbulence is required within the furance in order to complete the combustion as far as practicable together with a suitable method of removing the unburnt residue. Suitable means of controlling the furnace temperature is required in order to avoid wide fluctuations leading on the one hand to incomplete combustion or on the other hand to high temperatures causing damage to the furnace refractory and possible slagging of the ash.

To avoid the incinerat or becoming choked with ash and non combustible material during an extended period of operation it is necessary for this material to be removed continuously or batchwise from the incinerator. Consequently, these materials leave the incinerator at temperature of up to 900°C. Attempts to cool the hot material being removed, such as by allowing the removed material to cool in the surrounding air or by quenching with water, are on the whole unsuccessful, since the provision of space for effecting those procedures is inconvenient.

The invention has been made with these points in mind.

THE INVENTION

According to the invention there is provided a waste disposal incinerator comprising a fluidisable bed of refractory particles, a waste inlet positioned so as to introduce waste for incineration into the bed when fluidised at a point within the fluidised region, means for supplying fluidising gases to fluidise the bed and support combustion of any combustible material in the waste, means for supplying fuel as required to maintain combustion, a chamber in which hot refractory particles and any non-combustible material of the waste are collected for cooling before removal from the incinerator, and means for charging refractory particles to the bed to replace those collected in the chamber.

The refractory particles provide a large thermal capacity which assists in maintaining temperature control within the turbulent fluidised bed. This helps to ensure substantially complete combustion of combustible material within the waste together with the turbulent nature of the fluidised bed which ensures through mixing of the waste with the combustion air.

The incinerator of the invention is suitable for incinerating solid wastes, waste oils and sewage sludges and it is therefore emanently suited for use with the waste disposal plant described in our copending United Kingdom Patent Application No. 57591/71.

The fluidised bed will require for fluidisation relatively large quantities of fluidising air over and above the amount required for combustion. From the plant described in our above noted Patent Application, large quantities of noxious gases or foul air are produced during the aeration of the sewage sludge and other biodegradeable materials. Therefore according to another aspect of this invention, these noxious gases are used wholley or in part to fluidise the bed. This has the additional advantage that the high temperatures, e.g. about 800°C, maintained in the bed, and quickly reached by the fluidising gases, satisfactorily deodorise these noxious gases and so the gases can be vented to the atmosphere without risk of pollution.

The sewage sludge is introduced into the operating fluidised bed furnace at a level below the upper surface of the fluid bed. Pulverised solid waste may be admixed with the sewage sludge before introduction into the bed. It is most likely that the net calorific value of the resultant mixture will be sufficient to maintain self supporting combustion and means are provided for the addition of a suitable fuel oil or gas. The quantity of fuel admitted can be controlled by means of a temperature measuring device connected to a control thermocouple mounted within the bed.

In one embodiment of the invention any gross dense noncombustible portions of the waste, e.g. glass or metal which sink through the fluidised bed during the course of combustion are collected in the chamber for cooling before removal from the incinerator, lighter ash particles remaining suspended within the bed. An exit can be provided for withdrawal in a batchwise or discontinuous manner portions of refractory particles and noncombustible portions of the waste, the exit being far enough from the area of the chamber into which the hot refractory particles and non combustible material in the waste pass to allow the removal of cool material through the exit.

Preferably the chamber is at an angle such that when a batch of cool material is removed through the exit, the refractory particles and non combustible material in the waste remaining in the chamber forms a seal preventing substantial escape of fluidising air. Provision is made above the operating fluid bed level for a suitable recharging door through which the refractory bed particles may be replenished.

The depth of unfluidised material below the air distribution level is such as to ensure that the solid discharge products of the furnace are cooled to a temperature at which they may be handled conveniently.

In circumstances where there are waste oils for disposal these may be introduced in a similar manner to the fuel oil or gas.

Since relatively shallow fluidised beds function as essentially isothermal devices, the exit flue gases will leave the bed at temperatures approaching that of the bed operating temperature. This ensures deodorization of them and the overall thermal efficiency of the incinerator may be improved by means of a suitable heat exchange device in which a proportion of the heat content of the flue gases is exchanged with the incoming air supply. One suitable method of heat exchange is the provision of a second fluidised bed in series with the combustion bed and through which a number of tubes carrying the fluidising gases pass.

The embodiment of the invention described above is suitable for waste materials which do not contain large quantities of non-combustible material, e.g. waste oil. However, when large quantities of non-combustible materials are present in the waste material it is preferable to pass the hot non-combustible materials to a column through which cooling fluidising air can be passed. Thus in a second embodiment of the invention the chamber of the incinerator provides a passage leading to a column into which hot refractory particles and non-combustible material in the waste pass, a supply of fluidising air for fluidising and cooling the particles and material being provided in that column. The refractory particles and non-combustible material can thus be cooled before withdrawal from the incinerator.

Preferably, the fluidising gases are passed into the fluidisable bed and the column through fluidising air distributors at the base of the fluidisable bed and of the column, the distributors being inclined at an angle which exceeds the angle of repose of the refractory bed particles.

The distributors may comprise a single inclined distributor plate, and preferably comprises two or more inclined distributor plates, arranged to allow fluidising gas to pass through them to fluidise the two beds and to allow the smooth flow of refractory particles and incombustible solids into the chamber.

The incinerator according to the second embodiment of the invention provides a useful and convenient way of cooling the non-combustible material and retractory particles removed from the fluidisable bed, and has the advantage that this cooling can be carried out continuously before passing the non-combustible material to an apparatus for separating the other non combustible solids from the bed material which can then be returned to the fluidisable bed. Furthermore, the fluidising gas which is passed through the column can be mixed with the exhaust gas coming from the incinerator fluidised bed, thus cooling this gas to an acceptable temperature before passing it into apparatus for removing the smaller particles entrained in the exhaust gas of the incinerator. Thus heat exchangers or other separate cooling systems can be eliminated from the exhaust gas system with a subsequent saving in cost.

The chamber of the incinerator is preferably inclined in the direction from the fluidisable bed to the column so that, before operating the incincerator, the overall height of the bed in the fluidisable bed is greater than that in the column. It has been found that the angle of inclination of the distributors and the relative sizes of the fluidisable bed and column both have an important bearing on the efficient operation of the incinerator according to the invention.

Thus, initially part of the fluidising gas passing into the bed of the column can be passed to the bed of the fluidised bed to provide an increased amount of fluidising gas for the bed of the fluidizable bed to assist its initial fluidisation. Thus the amount of fluidising gas entering the bed of the fluidizable bed can be chosen to suit the normal operating conditions of the incinerator. It is thus possible to avoid the provision of external means for providing an increased supply of fluidising gas to the incinerator bed during its initial fluidisation. Furthermore, the total amount of fluidising gas required by the bed of the fluidisable bed and the bed of the column can be reduced with a subsequent decrease in the size of the fan and its associated motor.

In operation, streams of fluidising gas are passed to the fluidisable bed and the bed of the column through their respective distributors. Waste material and fuel if necessary are fed to the fluidisable bed comprising particles of refractory material, for example, sand, and the combustible part of the waste material is burnt. The noncombustible material passes from the incinerator bed into the inclined chamber and thence into the column, caused by a pressure gradient along the chamber, due to the greater height of the bed of the fluidisable bed as compared with the bed of the column, the difference in heights being caused by the removal of material from the bed of the column to an outlet.

The non combustible material and refractory particles are thus cooled after passing through the bed of the column and can then be conveniently handled.

As explained earlier, the chamber of the incinerator is inclined so that the height of the bed of the column above its distributor is greater than the height of the bed of the fluidisable bed above its distributor i.e. the two beds are level and thus prior to ignition the pressure at the distributor of the column is greater than the pressure at the distributor of the fluidisable bed. Consequently, a proportion of the fluidising gas passing into the column passes into the fluidisable bed through the inclined chamber. Thus, during the initial fluidisation there is an increased amount of gas passing into the incinerator bed to assist its fluidisation.

The velocity of the fluidising gas passing through the distributor of the fluidisable bed can thus be chosen to suit the normal operating conditions of the incinerator, while the total amount of fluidising gas passing through both distributors can be chosen to provide the minimum superficial velocity necessary for the initial fluidisation.

It has been found that during operation of the incinerator according to the second embodiment, fuel and cooling air are carried down through the furnace outlet with the non combustible solids and refractory particles. This has made it difficult to maintain an adequate seal in the region where the incombustible material is separated from the bed material. This problem can however, be overcome by providing a duct for the collection of any cooling air which passes through this outlet instead of up the column and preferably interconnects the furnace outlet with the fluidisable bed at a point above the level of the bed of the fluidisable bed, the connecting points being chosen so that the pressure is higher at the lower end of the duct than at the upper end. Thus excess fuel and fluidising gas in the furnace outlet are caused to pass up the duct into the furance and thence into the flue outlet. Preferably, the duct leads to inspection ports for cooling them and/or to the means for charging refractory particles to the bed so that the gas passing to that means prevents hot gasses from the fluidisable bed escaping during charging.

The provision of this duct ensures stable conditions in the furnace outlet, and any bed material carried up the pipe will automatically pass back into the furnace.

In order to improve the feeding of the waste material into the fluidisable bed and avoid the possibility of the waste material in the screw feeder continuing to burn, when the waste is fed to the bed, the waste is fed by means of a screw feeder inclined to the horizintal so that waste is fed upwards into the fluidisable bed. It has been found that the most suitable angle is between 30° and 45° to the horizontal.

By inclining the screw feed in this way a pocket of $CO_2$ gas tends to form at the inlet to the fluidisable bed, and thus the spread of combustion down the feeder is prevented. Furthermore, inert bed material temporarily falls down the feeder, and this decreases the chance of fire spreading along the screw feeder.

Incinerators according to the invention will now be described by way of example, with reference to the accompanying drawings, in which.

Figure 1:
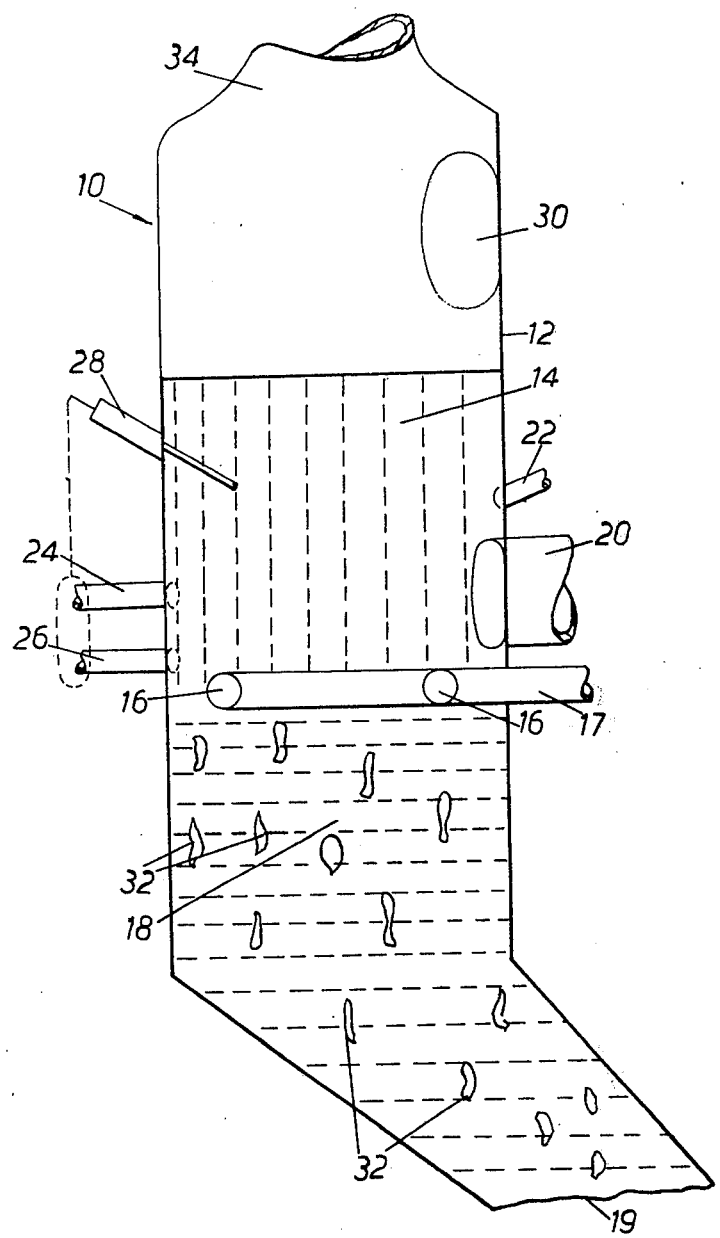
FIG. 1 is an upright section through one form of incinerator acccording to the invention.

The incinerator 10 shown in FIG. 1 has an upright cylindrical shell 12 within which is a fluidised bed region 14. At the base of this region a number of fluidising gas inlets 16 are provided supplied from a main 17.

Below the region 14 is a cylindrical chamber 18 whose lower end tapers and is inclined towards an exit 19 for withdrawal of refractory particles and non combustible material. The exit is far enough away from the area of the chamber into which the hot refractory particles and non combustible material in the waste pass to allow the removal of cool material through the exit.

The lower end of the chamber is at an angle such that when a batch of cool material is removed through the exit, the refractory particles and non combustible material in the waste remaining in the chamber form a seal preventing substantial escape of fluidising air, and is preferably at the angle of repose of said particles used in the bed.

The region 14 is provided with an inlet 20 through which the waste to be incinerated is fed into the fluidised bed, a waste oil inlet 22 through which any waste oil is fed for combustion and fuel oil inlet 24 for the supply of sufficient fuel to maintain self-supporting combustion in the bed. A gas inlet 26 for staring up the bed may also be provided.

A control thermocouple 28 is provided to determine the temperature of the fluidised bed during operation and this thermocouple is arranged by suitable means to control the amount of fuel oil and/or gas supplied to the bed so as to maintain substantially constant combustion conditions.

Above the bed region 14 is provided a sand recharging door 30.

In operation fluidising air, which can consist wholly or partly of foul air from a waste treatment plant such as the one described in our above noted Patent Application, is supplied to the bed region by the inlets 16. The fluidising gas fluidises a bed of sand particles which have a high thermal capacity and so assist in maintaining relatively steady combustion conditions irrespective of the nature of waste supplied for combustion.

The waste is supplied to the bed through the inlet 20 plus any waste oil through inlet 22 and the temperature of the bed is chosen so as to achieve as complete combustion as possible. In addition the turbulent nature of the bed ensures excellent mixing of the waste and fluidising air so promoting substantially complete combustion.

The thermocouple 28 continually monitors the bed temperature and is used to control the amount of fuel oil and or gas supplied through inlets 24 and 26 to keep the combustion bed self-supporting.

The waste burns to ash particles which remain in the bed although stable conditions are reached when ash particles drop into the chamber and leave with the fluidising air (to be separated before the air is vented to the atmosphere) at a rate equaling their rate of formation. In addition any dense incombustible materials 32 such as glass or metal drop below the air inlets 16 into the chamber 18. Also some sand particles continuously drop into the chamber and fill it so sealing off the exit 19. Continuously or from time to time quantities of material are removed from the chamber 18 through the exit 19 so as to maintain the level of material in this region just below the inlets 16. Then fresh sand or sand separated from the mixture leaving the exit 19 is introduced through the inlet 30 so as to maintain the bed volume.

The height of the hopper region 18 is chosen so that the mixture removed from the exit 19 is sufficiently cool to handle.

The hot fluidising gases leave the shell 12 through an outlet conduit 34, and, after separation of fine ash particles, can be vented to the atmosphere. The high temperatures to which this air is subjected in the bed region ensures that these gases are deodorized and so venting causes no problem.

Figure 2:
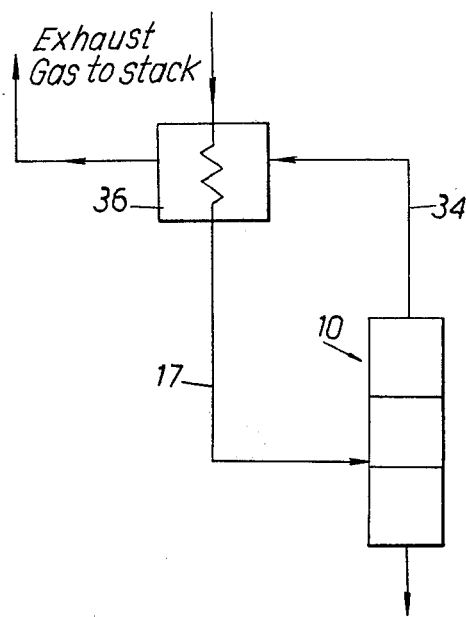
FIG. 2 is a diagram of the incinerator shown in FIG. 1 showing one way of preheating the fluidising air
Figure 3:
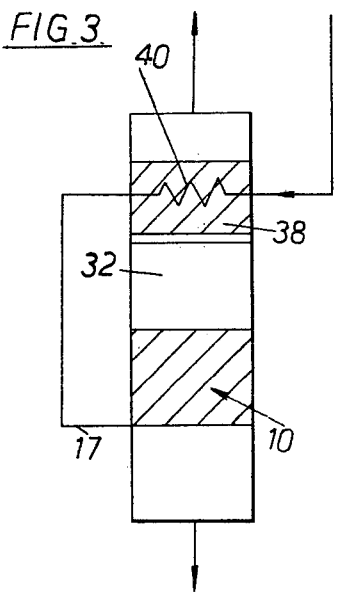
FIG. 3 is a diagram of the incinerator shown in FIG. 1 showing another way of preheating the fluidising air.

In order to improve the thermal efficiency of the incinerator, the combustion gases may be passed in heat exchange with the incoming fluidising air. This can be achieved as shown in FIG. 2 by means of a suitable heat exchanger 36, but is preferabl effected in the way shown in FIG. 3. According to this method, the gases pass to a further fluidised bed 38, e.g. of sand or other refractory particles and tubes 40 carrying the fluidising air are immersed in this bed 38. The use of this bed 38 ensures very efficient and high heat transfer.

As will be appreciated the incinerator 10 is simple yet can most efficiently deal with the incineration of waste and deodorizing the noxious gases giving products which can readily be disposed of without causing objectionable pollution.

Figure 4:
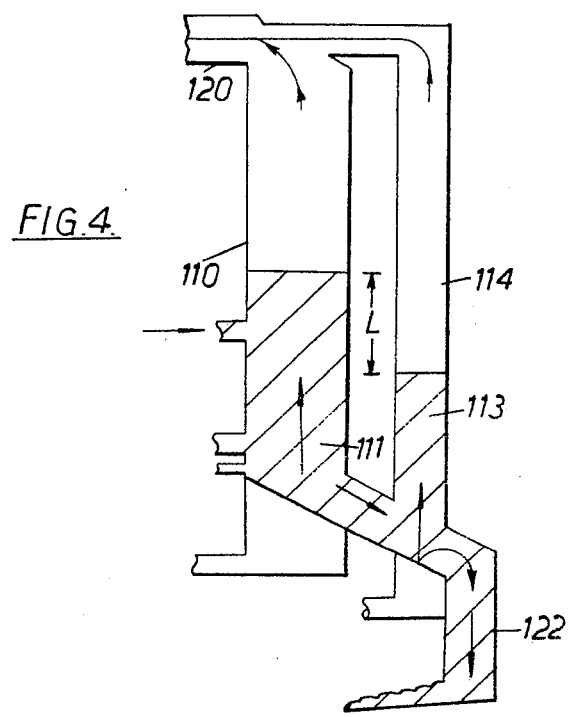
FIG. 4 is an upright section through another form of an incinerator according to the invention.
Figure 5:
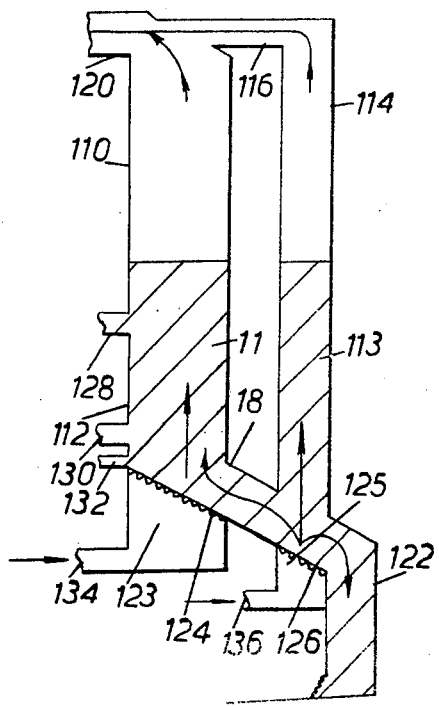
FIG. 5 is an upright section through the incinerator of FIG. 1 in a different stage of operation.

The incinerator 110 shown in FIGS. 4 and 5 is particularly suitable for waste which contains large quantities of incombustible materials and comprises an upright cylindrical shell 112 within which is provided a main fluidised bed region 11. At the base of this region a distributor 124 is provided through which fluidising gas can be passed from gas box 123 connected by a tube 134 to a gas supply (not shown). The distributor 124 shown is an inclined distributor plate the inclination of which is chosen to exceed the angle of repose of the particles. The upper end of the cylindrical shell is connected to an outlet duct 120.

The cylindrical shell 112 communicates at its lower end through an inclined duct to a smaller-diameter column 114 which contains a cooling fluidised bed region 113. At the base of this region a second distributor 126, which is an inclined distributor plate, is provided. A gas box 125 is provided below the distributor 126 and is connected by a pipe 136 is a gas supply (not shown). The upper end of the column 114 is connected by a duct 116 to the upper end of the cylindrical shell 112 connected to the outlet duct 20. The lower end of the cylindrical shell 114 is connected to an outlet duct 122.

An inclined chamber 118 connects the cylindrical shell 112 to the column 114.

A duct 128 is provided on the side of the cylindrical shell 112 through which fluidised bed material can be fed to the fluidised bed region 111.

Fuel is passed to the fluidised bed region 111 through a duct 132 on the side of the cylindrical shell 112 below the duct 28 and the waste material is passed to the bed region 111 through a duct 130.

In the operation of the incinerator, fluidising gas, for example air, is fed in separate streams to the bed region 111 and bed region 113 through the distributors 124 and 126 respectively. The fluidising gas fluidises the bed material which may be, for example, sand particles, which have a high thermal capacity thus assisting to maintain relatively steady combustion irrespective of the nature of the waste to be incinerated.

The temperature of the bed 111 is chosen to provide as complete combustion as possible of the waste being supplied to the bed 111 through the duct 130. the turbulent nature of the bed 111 provides excellent mixing of the waste and bed particles and promotes efficient combustion of the combustible materials to ash particles.

These ash particles and any other incombustible material from the incinerator bedpass along the inclined chamber 118 to the cooling bed 113 which is fluidised by, for example, air from the distributor 126. The stream of waste and non-combustible materials, thus cooled then pass to the vertical outlet duct 122. The cooled particles can then be conveniently handled and the ash and non combustible particles can be separated from the bed material.

The driving force for the ash and non combustible particle flow is provided by the pressure gradient along the inclined chamber 118 caused by the height of the main bed 111 above the distributor 124 being greater than the height of the bed 113 above the distributor 126 as can be seen in FIG. 4 where the difference in levels is indicated by 'L'. The particles are thus caused to flow towards the outlet duct 122.

The fluidising gas which passes through the cooling bed 113 passes into the duct 116 and is eventually mixed with the hot fluidising gas which has passed through the incinerator. The final flue gas thus produced passes into the duct 120 and is of a sufficiently low temperature to be passed into flue gas cleaning apparatus without the need for further cooling.

In order to maintain the required operating level for the main bed 111 additional bed material can be fed through the duct 128 to the bed.

When starting up the incinerator 110 the level of the bed 111 will be the same as that of the bed 113 and due to the inclination of the chamber 118. The height of the bed 111 above the distributor 124 will be less than the height of the cooling bed 113 above the distributor 126. Initially, fluidising gas is passed through the distributor 124 to fluidise the main bed 111 and fluidising gas is passed through the distributor 126 to fluidise the cooling bed 113. The vertical inlet 122 is closed to prevent the removal of any material along the duct 118 and consequently due to the greater pressure at the upper face of the distributor 126 then at the upper face of the distributor 124 a proportion of the air admitted via the distributor 126 passes upwardly along the chamber 118 to the incinerator bed 111. Thus in the starting up operation the main bed 111 is provided with extra fluidising gas necessary to start the fluidising process.

The velocity of the fluidising gas which passes through the main distributor 124 can thus be chosen to suit the normal operating conditions of the incinerator while the total amount of fluidising gas passing through the distributors 124 and 126 can be chosen to provide the minimum superficial velocity which is necessary for the fluidisation at the start up. Thus, the problem of providing a distributor for the incinerator bed 111 which is sufficiently large to provide adequate fluidising gas for the start up operation while at the same time providing an ideal velocity during normal operation can be overcome.

As will be appreciated the incinerator 110 issimple, yet can effectively deal with the combustion of partially combustible wastes while allowing the non conbustible materials to be continuously removed from the combustion bed and cooled.

Figure 6:
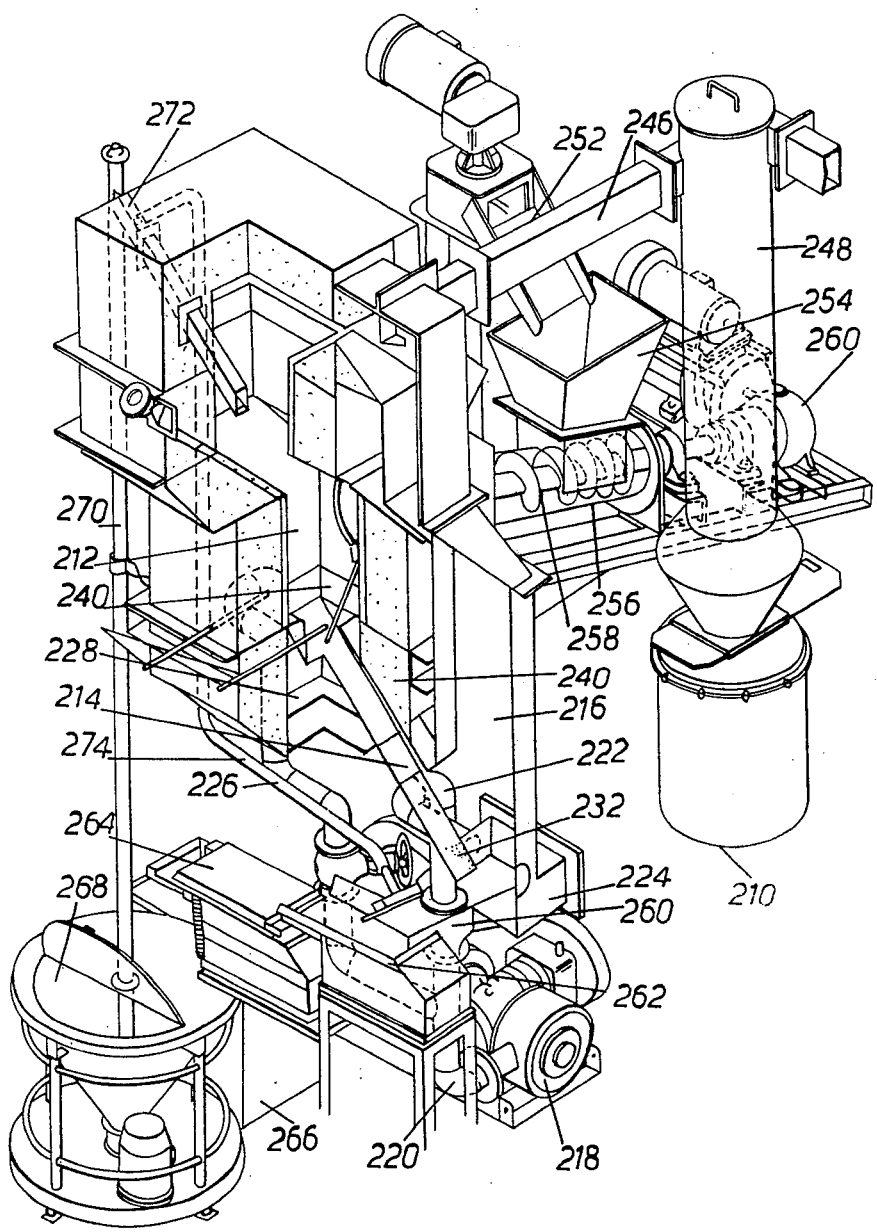
FIG. 6 is a partly cut-away perspective view of a practical embodiment of the invention.

The incinerator 210 shown in FIG. 6 comprises a main fluidised bed 212, an inclined chamber 214 and a column 216 through which fluidising gases pass to fluidise and cool refractory particles and non combustible solids passing through it from the main fluidised bed.

In operation fluidising air is passed from a blower 218 into a duct 220, and thence into a duct 222 leading to a windbox 224 below the column 216. Simultaneously, fluidising air is passed from the duct 220 into a duct 226 and thence into a windbox 228 below the main fluidised bed.

The fluidising air fed to the windbox 224 below the column 216 is passed into the column through distributor plates 232 at the lower end of the inclined chamber 214.

The fluidising air fed to the windbox 228 below the main fluidised bed is passed through distributor plates 240 at the lower end of the main fluidised bed 212.

The upper ends of main fluidised bed 212 and column 216 lead to a common flue 246, and thus the hot combustion gases from the main fluidised bed 212 mix with the cooler fluidising gases passed through the column, to provide a relatively cool flue gas which passes to a cyclone 248 where dust and entrained particles are removed from it.

Fuel is fed to the main fluidised bed 212 through duct 250, and waste to be incinerated is passed via a chute 252 into a hopper 254 and thense into a screw feeder 256 which comprises a screw 258 driven by a motor 260. The screw feeder 256 is inclined at an angle of 30° to 45°, to the horizontal so that waste entering the feeder is fed upwardly into the main body of the fluidized bed. This inclination of the feeder avoids the possibility of fire spreading along the feeder when it is stopped, since a pocket of $CO_2$ gas collects near the end of the feeder and inert refractory particles fall into the feeder.

Refractory particles and non combustible material leaving the column 216 pass down a furnace outlet 260 to a discharge material controller 262. The particles and non combustibles are passed to a screen 264 where the bed particles are separated from the non combustible material which is allowed to drop into a container 266. Separated refractory particles are returned to a bed material reservoir 268 from which particles are withdrawn by a screw conveyor 270 into a duct 272, and thence into the main fluidised bed 212.

In order to remove excess cooling air passing down the furnace outlet 260 an air duct 274 is provided to collect the air. The air duct 274 leads to the duct 272 through which the refractory particles are charged to the bed to prevent hot gases from the bed escaping during charging.

The operation of the incinerator is similar to the incinerator diagrammatically shown in FIGS. 4 and 5, fuel being passed when necessary to maintain combustion, and the temperature of the bed being chosen to ensure as complete combustion as possible of the waste.

The inclination of the chamber 214 means that initially the level of the bed in the main fluidised bed 212 will be the same as that of the bed in the column 216, and thus during the start up of incinerator due to the greater air pressure at the base of the column 216 than at the bed of the fluidised bed 212 fluidising gas passing through the distribution 232 will pass into the main bed 212 to assist its initial fluidisation.

In normal operation the height of the bed in the column will be less than that of the main bed due to the removed bed particles and non combustibles, and bed particles and non combustible material leaving the main bed will thus be caused to flow along the chamber into the column to be cooled before being removed from the furnace.

The incinerator 210, is simple, and yet very effectively deals with the incineration of waste material containing combustible and non combustible material.

What we claim is:

1. A waste disposal incinerator comprising
   a. a fluidisable bed of refractory particles;
   b. a waste inlet positioned so as to allow waste for incineration to be introduced into said bed when fluidised at a point within a fluidised region of said bed;
   c. means for supplying fluidising gas to fluidise said bed and support combustion of any combustible material in said waste;
   d. means for supplying fuel as required to maintain combustion;
   e. a chamber in which hot refractory particles and any non-combustible material are collected for cooling before removal from the incinerator;
   f. exit for removal of refractory particles and non-combustible material from the incinerator;
   g. said chamber being at an angle such that when a batch of cool material is removed through the exit, said refractory particles and non-combustible material in the waste remaining in the chamber form a seal preventing substantial escape of fluidising air; and
   h. means for charging refractory particles to said bed to replace those collected in said chamber.

2. An incinerator according to claim 1 in which said chamber has an exit for withdrawal of refractory particles and said non combustible material in the waste, said exit being far enough from the area of the chamber into which the hot refractory and non combustible material in the waste pass to allow removal of cool material through the exit.

3. An incinerator according to claim 1 in which said fluidising air is arranged to pass in heat exchange with hot gases from the fluidisable bed for pre-heating.

4. An incinerator according to claim 1 in which waste is arranged to be charged through said inlet by means of a screw conveyor, said screw conveyor being inclined so as to feed the waste upwardly towards the inlet.

5. An incinerator according to claim 4 in which said screw conveyor is inclined at an angle of 30° to 45° to the horizontal.

6. An incinerator according to claim 1 in which the refractory particles are sand particles.

7. A waste disposal incinerator comprising
   a fluidisable bed of refractory particles, a waste inlet positioned so as to allow waste for inceneration to be introduced into said bed when fluidised at a point within a fluidised region of said bed, means for supplying fluidising air to fluidise said fluidised bed and support combustion of any combustible material in said waste,
   means for supplying fuel as required to maintain combustion,
   a chamber in which hot refractory particles and any non-combustible material are collected for cooling
   a column into which said hot refractory particles and non-combustible material in said waste can be passed from said chamber, a means for supplying fluidising air to said column to fluidise and cool said hot refractory particles and particles in said column,
   a first fluidising air distributor through which said fluidising air is supplied to fluidise said fluidised bed, a second fluidising air distributor through which said fluidising air is passed to fluidise and cool said hot refractory particles and non-combustible material in said column said chamber being included in a direction from said fluidisable bed to said column so that in operation the overall height of said fluidisable bed is greater than that in said column.

8. An incinerator according to claim 7 in which said fluidisable bed and column are connected to a common flue for the fluidising gases.

9. An incinerator according to claim 7 in which inclined fluidising air distributors are provided at the base of said fluidisable bed and of said column, said distributors being inclined at an angle which exceeds the angle of repose of said refractory bed particles.

10. An incinerator according to claim 7 in which said column has an outlet for cooled refractory particles and non combustible material in the waste, and a duct for the collection of any cooling air which passes through this outlet instead of up said column.

11. An incinerator according to claim 10 in which said duct leads to inspection parts for cooling them and/or the said means for charging refractory particles to the bed so said air passes to those means and prevents hot gases from said bed escaping during charging.

12. An incinerator according to claim 7 in which waste is arranged to be charged through said inlet by means of a screw conveyor, said screw conveyor being inclined so as to feed the waste upwardly towards the inlet.

13. An incinerator according to claim 12 in which said screw conveyor is inclined at an angle of 30° to 45° to the horizontal.

14. An incinerator according to claim 7 in which the refractory particles are sand particles.

* * * * *